United States Patent [19]

Grindheim

[11] E Re. 30,603

[45] Reissued May 5, 1981

[54] TWO WIRE CURRENT TRANSMITTER RESPONSIVE TO A RESISTANCE SENSOR INPUT SIGNAL

[75] Inventor: Earl A. Grindheim, Minneapolis, Minn.

[73] Assignee: Rosemount Inc., Eden Prairie, Minn.

[21] Appl. No.: 934,451

[22] Filed: Aug. 17, 1978

Related U.S. Patent Documents

Reissue of:

[64] Patent No.: 3,859,594
Issued: Jan. 7, 1975
Appl. No.: 14,748
Filed: Feb. 24, 1970

U.S. Applications:

[63] Continuation of Ser. No. 661,988, Aug. 21, 1967, abandoned.

[51] Int. Cl.[3] ..... G01R 27/00
[52] U.S. Cl. ..... 324/57 R
[58] Field of Search ..... 324/57 R, 62 R, DIG. 1; 73/362 AR

[56] References Cited

U.S. PATENT DOCUMENTS

| | | | |
|---|---|---|---|
| 2,930,224 | 3/1960 | Bodner et al. | 324/65 X |
| 2,974,279 | 3/1961 | Barry et al. | 324/62 |
| 3,177,427 | 4/1965 | Kuntz et al. | 324/61 |
| 3,286,171 | 11/1966 | Fluegel et al. | 324/60 |
| 3,302,106 | 1/1967 | Shaw | 324/99 X |
| 3,322,971 | 5/1967 | Chung-Chuan Liu | 307/297 |
| 3,408,584 | 10/1968 | Miller, Jr. et al. | 330/9 |
| 3,483,476 | 12/1969 | Kobayashi et al. | 330/10 |
| 3,517,556 | 6/1970 | Barker | 73/362 AR |

OTHER PUBLICATIONS

Oswald, Thermistor Temperature to Current Transducer, IBM Technical Disclosure Bulletin, May 1965, pp. 1124–1126.

*Primary Examiner*—Stanley T. Krawczewicz
*Attorney, Agent, or Firm*—Neuman, Williams, Anderson & Olson

[57] ABSTRACT

Circuitry including a resistance sensor is excited by an external power source. A reference voltage is established, the voltage developed across the sensor resistance is compared at an amplifier input with a reference voltage signal and the voltage across a feedback resistor, and the total current drawn through the circuitry adjusts as a function of the sensor resistance to give a balanced amplifier input. Total current may be made a linear function of sensor resistance or a nonlinear function by proper selection of certain resistors.

28 Claims, 3 Drawing Figures

TWO WIRE CURRENT TRANSMITTER RESPONSIVE TO A RESISTANCE SENSOR INPUT SIGNAL

Matter enclosed in heavy brackets [ ] appears in the original patent but forms no part of this reissue specification; matter printed in italics indicates the additions made by reissue.

This application is a continuation of my copending application Ser. No. 661,988, filed Aug. 21, 1967 for Remote Measuring System Utilizing Only Two Wires For Supplying Current To The Sensing Circuitry And Adjusting The Current Flow So That It Is Representative Of A Variable Condition, now abandoned.

BACKGROUND OF THE INVENTION

1. Field of the Invention

This invention relates to modulation or control of an electrical current which is dependent on the resistance of a sensing element where the two wires which carry power to the sensing circuitry are also used as the signal current transmission means. The measurement is one in which direct current power is supplied to remotely located sensing and current modifying circuitry which acts to control the total current flow proportional to a measurand.

2. Description of the Prior Art

The problem of conversion of a measured (where "measurand" refers to the quantity of physical variable being measured) to an electrical signal and subsequent transmission of that signal to recorder and control equipment which may be located some distance away has been handled in many ways in the past. In general four-wire systems have been used where power is supplied via two of the wires and a voltage signal is transmitted via the other two wires. One of the voltage signal leads may be common to one of the power leads for some of these systems. Such a system typically requires use of an amplifier and/or other signal conditioning equipment at the point of measurement in order to supply an accurate signal representative of the measurand. The advantages of using the same two wires for power supply and information transmission has long been recognized and various designs of transmitting equipment have evolved. The prior art approach for force transducers where direct current power and signals are required has been to supply sufficient current to rebalance the force being measured by current through an electromagnetic arrangement. A small amount of current is routed through a null sensing circuit and amplifier which in turn controls the main current supply to the force balance coil. Such circuitry is widely used in industrial pressure measurements and an example is described in U.S. Pat. No. 3,274,833.

For temperature sensing transmitters self-balancing circuits using a motor driven potentiometer have commonly been used. Examples of various designs which have been developed in the past are given in the chapter titled "Measuring and Transmission Methods" of the book Handbook of Applied Instrumentation, McGraw-Hill Book Co., 1964, Library of Congress Catalog Card No. 62-21926. Those various designs all employ electromechanical elements of one type or another, to achieve self-balancing circuitry operating from a resistance signal or thermocouple signal. In almost all cases a two phase motor is relied on to provide adjustment of a potentiometer or variable condenser to achieve a balance condition. In one example, the current from a thermocouple passes through the field of a permanent magnet deflecting a beam against a calibrating spring. Beam deflection is sensed by other circuitry which supplies a high level, direct current signal suitable for transmitting to a recorder. A portion of the signal is shunted through a feedback coil which opposes the force caused by the thermocouple current thereby maintaining a balanced condition.

Since these previous designs have all required electro-mechanical devices they have the disadvantages of rather slow response, limited life associated with a loss of resolution where frictional contacts are involved, and poor performance under adverse environments such as wide variations in temperature, excessive humidity and dust.

SUMMARY OF THE INVENTION

This invention comprises a resistance network resembling a bridge arrangement including a first resistor which changes resistance in response to a measurand and a second resistor which has one end connected to the output of an amplifier controlled current regulator. The output of the bridge is fed to the amplifier input with the correct polarity to always insure a balanced condition at the amplifier input terminals duee to opposing signals arising from the first resistor and the feedback current through the second resistor. The circuit is self-balancing and the total current drawn by the circuit is proportional to the measurand value. In one embodiment linearization of the relation between measurand and total current is provided by having the feedback current effectively adjust the bridge excitation in addition to balancing the bridge.

The resulting circuit does not require electromechanical devices such as rotary or linear motors and is free of the disadvantages of such devices. Conversion or transduction of a measurand signal into a direct current signal is accurately accomplished with a minimum of components resulting in a high performance transmitter having long life and high reliability.

It is therefore a primary object of this invention to provide a nonmechanical self-balancing circuit responsive to a measurand where the total current drawn by the circuit is proportional to the measurand.

BRIEF DESCRIPTION OF THE DRAWINGS

FIG. 1 is a schematic showing the basic circuit of the invention helpful in understanding the invention and the manner in which it is used.

FIG.3 is a schematic showing an alternate arrangement of some of the basic circuit components.

DESCRIPTION OF THE PREFERRED EMBODIMENTS

Figure 2:
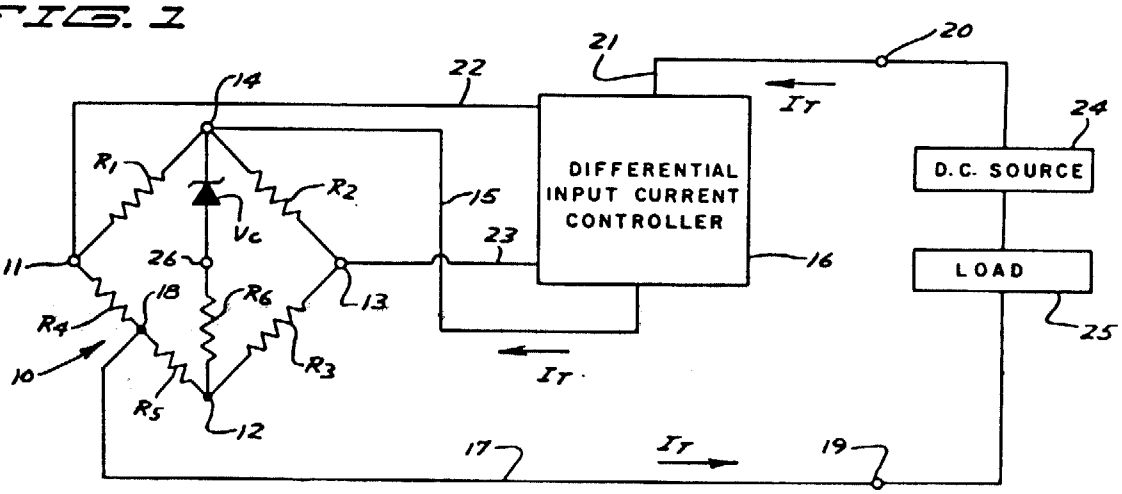
FIg. 2 is a circuit schematic showing details of a preferred embodiment useful for practicing the invention.
Figure 9:
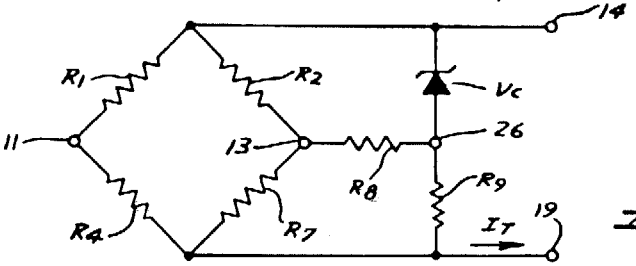
Figure 2:
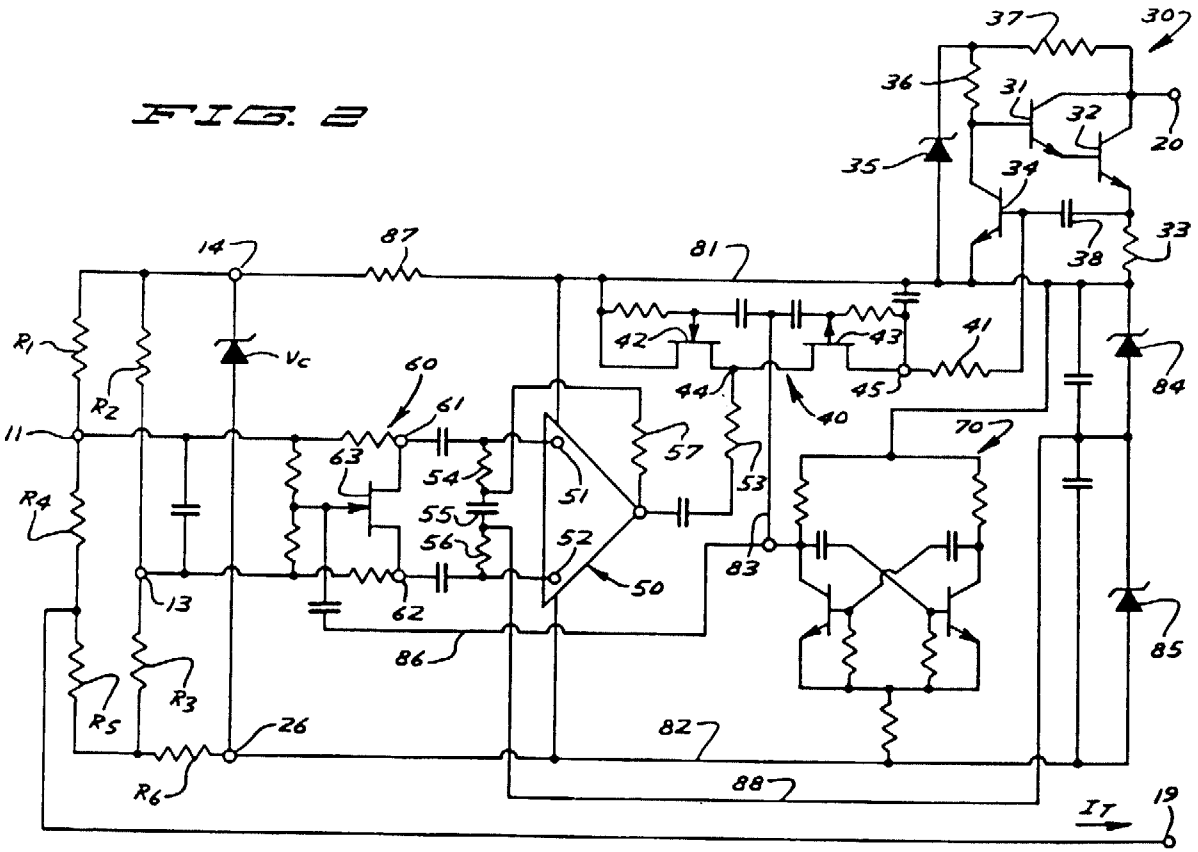

Referring to the drawings and the reference notations thereon FIG. 1 shows a closed series network 10 of resistors $R_1$ through $R_5$ connected in an arrangement which somewhat resembles a conventional bridge. Resistor $R_1$ is adjacent $R_2$ and opposite $R_3$ and the series combination of $R_4$ and $R_5$ is opposite $R_2$ with $R_4$ being connected to $R_1$ at signal output terminal 11 and $R_5$ connected to $R_3$ at junction 12. Signal terminal 13 is between $R_2$ and $R_3$ and the cathode of Zener diode $V_c$ is connected to terminal 14 between $R_1$ and $R_2$. The symbol $V_c$ designates a source of reference voltage having a voltage level of $V_c$ volts. The anode of Zener diode $V_c$ is connected to one end of $R_6$ at terminal 26 and the other end of $R_6$ is connected to junction 12. Total current drawn by the network 10 is designated $I_t$ and is shown as being received by line 15 which connects the output of a differential input current controller 16 to terminal 14. The total current $I_t$ leaves network 10 by line 17 which connects junction 18 between $R_4$ and $R_5$ to power return terminal 19. The total current $I_t$ is supplied to the current controller 16 from input terminal 20 which is connected to 16 by line 21. The signal terminals 11 and 13 connect to current controller 16 by lines 22 and 23 respectively. Controller 16 responds to a voltage difference between lines 22 and 23 in such a manner to reduce any such voltage to substantially zero by adjustment of total current $I_t$ and there is substantially zero current drawn by lines 22 and 23. A direct current source 24 and a load 25 are shown serially connected across terminals 19 and 20.

In operation a change in one or more of the resistors $R_1$ through $R_5$ as a result of a measurand change ("measurand" refers to the quantity of physical variable being measured such as temperature or strain) gives rise to a voltage signal between lines 22 and 23 which causes the controller to adjust the current level $I_t$ to reduce the voltage signal to zero. The change in current $I_t$ is thus a measure of change in resistance of one or more of the resistors $R_1$ through $R_5$ and this change in current is monitored by load 25 which may be a recorder for example. For an understanding of the circuit response assume that $R_6$ is zero. In this case the voltage across terminal 14 and junction 12 is a constant value $V_c$ regardless of the current flow through diode $V_c$. Accordingly the voltage on line 23 is held constant by $V_c$ so long as the ratio between $R_2$ and $R_3$ does not change. Then assuming $R_1$ is constant and $R_4$ is allowed to vary, the voltage on line 22 will rise with an increase in $R_4$. In order to have a self balancing response this increase in voltage on line 22 must give rise to an increase in current $I_t$ from controller 16. The increase in current will not affect the voltage on line 23 (since it is assumed that for this example $R_6$ is zero) however it will have an opposing effect to the voltage on line 22 since it will give a change in voltage across resistor $R_5$ of opposite sign to the change in voltage across $R_4$ due to the assumed increase in resistance of $R_4$. Then to consider the effects of a finite value of $R_6$ assume $R_6$ to be of value such that the voltage drop across $R_6$ is small compared to $V_c$. Then an increased current through the series combination of $V_c$ and $R_6$, caused by an increase in $R_4$ for example, raises the voltage on line 23 by an amount proportional to the increase in voltage across $R_6$. The same percent increase would also be felt as a part of the voltage change on line 22. Since the voltage on line 22 is assumed to be greater than that on line 23 due to an increase in $R_4$ the effect of the increased voltage across $R_6$ is to require still more current $I_t$ to flow to reduce the voltage difference to zero between lines 22 and 23. Since $R_6$ introduces a correction or adjustment based upon the change in current $I_t$ its effect is a higher order effect and it may be used as such to selectively shape the relation between current $I_t$ and resistor $R_4$ for example. Analysis of the network 10 gives the following expression between $I_t$ and the various resistors shown:

$$I_t = V_c[R_2(R_4+R_5) - R_1R_3]/(R_1[R_5(R_2+R_3)+R_6(R_3+R_5)] - R_2R_4R_6) \quad (1)$$

It may be noted that if $R_6$ is zero the relation between $I_t$ and $R_4$ is linear and further that if $R_6$ is not zero the current $I_t$ will respond to positive changes in $R_4$ in an increasingly sensitive manner. It may also be noted that an increasing $R_2$ would result in $I_t$ increasing at a less than linear rate if $R_6$ is zero and at a rate selectible from less than linear to greater than linear if $R_6$ is finite. An increasing $R_1$ or $R_3$ would give a decreasing current $I_t$ and the rate of decrease would reduce whether or not $R_6$ was zero however the magnitude of reduction depends somewhat on $R_6$.

As a further example consider linearization of the relation between $I_t$ and temperature when a platinum resistance thermometer is used as the measurand sensing instrument. Picking $R_4$ as the thermometer the relation between resistance and temperature is $$R_4 = R_0(1+\alpha T - \beta T^2) \quad (2)$$

for tempertures zero degrees Celsius and higher, where $R_0$ is the resistance at 0° C., T is temperature in degrees Celsius and $\alpha$ and $\beta$ are constants. Substituting expression (2) into expression (1), expanding terms and solving for the condition causing disappearance of terms involving $T^2$ in the numerator gives $$R_6 = \frac{R_2 + R_3}{\frac{R_2}{R_1}\left[\frac{R_0}{R_5}\left(\frac{\alpha^2}{\beta} - 2\right) - 1\right] - 1} \quad (3)$$

Accordingly it is only necessary to satisfy expression (3) to achieve a linear relation between total current $I_t$ and temperature when a resistance thermometer such as platinum is used as $R_4$. Similar analysis may be made for the case where $R_2$ is a platinum thermometer. If the rate of resistance change as a function of temperature increases, as it does for a nickel wire thermometer for example, the element may be shunted by a constant resistance to linearize the response and it may then be used in place of $R_4$ with a zero value for $R_6$. A thermistor or thermistor network involving a series-shunt combination of resistors having a negative change of resistance with temperature would preferably be used in place of $R_1$ or $R_3$.

In some cases it is desirable to have more than one resistor respond to the measurand. Resistance strain gage measurements commonly employ at least two resistors, one increasing with strain and one decreasing, and these would be preferably located in adjacent positions of network 10. If a temperature difference as sensed by two thermometers having like characteristics is to be measured these resistance thermometers would also be located in adjacent portions of network 10, for example in place of $R_4$ and $R_3$. A range or span adjustment can be conveniently made by adjustment of magnitude of $R_5$ and zero may be adjusted by $R_3$ for example.

In some instances it is desirable to use the circuitry shown for converting a low level voltage signal such as a thermocouple output to a controlled current signal. A thermocouple or other voltage signal may be introduced in series with one of the resistors $R_1$ through $R_5$ or by connection in series with, or across, current controller signal lines 22 and 23. Resistor $R_4$ may be selected to be temperature responsive also so that it serves as a reference junction compensation for a thermocouple having its reference junction adjacent $R_4$. In all such cases the differential input current controller responds to a voltage signal across lines 22 and 23 in such a manner to reduce that voltage to zero and the resulting current drawn by the circuit and available for measurement across load 25 bears a predetermined relation to the voltage signal and its origin.

A detailed schematic of a differential input controller together with network resistors $R_1$ through $R_6$ and reference voltage $V_c$ is shown in FIG. 2. The system of FIG. 2 is a carrier amplifier type controller giving a high degree of freedom in choice of direct current voltage levels throughout the circuit. While a "straight" DC or non-carrier type controller may be used the carrier amplifier type controller generally gives overall higher performance than would be available with a direct current coupled amplifier.

The network resistors $R_1$ through $R_6$ and reference voltage $V_c$ are connected in FIG. 2 in the same arrangement of FIG. 1 however the main supply of controller feedback current is now delivered to the network at terminal 26 between $R_6$ and the anode of Zener diode $V_c$. The circuit is arranged to receive direct current power at terminal 20 which connects to a current controller stage designated generally at 30. The current is controlled by stage 30 in response to a signal from a demodulator 40 which in turn connects to the output of a differential amplifier 50. Amplifier 50 responds to the signals across network terminals 11 and 13 which are coupled to amplifier 50 by a modulator 60. Modulator 60 and demodulator 40 are synchronously driven by a multivibrator 70 which is a square wave, symmetrical, free-running type multivibrator. The modulator 60 and demodulator 40 may be referred to as choppers and the multivibrator is a specific example of a chopper driver generating a wave form commonly referred to as chopper drive. The total current drawn by the circuit is effective in obtaining a zero voltage difference across network terminals 11 and 13 in the same manner as described with reference to FIG. 1 and consequently the current $I_t$ which would be measured by a serially connected load as was shown in FIG. 1 is accurately described by expression (1) when the circuit is operating in a balanced condition.

Current controller 30 includes a pair of transistors 31 and 32 having their collectors connected to input power terminal 20. These transistors form a Darlington amplifier since the emitter of 32 connects through resistor 33 to power line 81 which line is the main source for the other circuit elements. Controller 30 also includes transistor 34 and Zener diode 35 which operate to give a substantially constant current in the base to emitter circuits of 31 and 32 even though the input power supplied to terminal 20 may vary considerably in voltage level. The base of transistor 31 connects to the collector of 34 and connects through resistor 36 to the junctions between the cathode of Zener diode 35 and resistor 37. The other end of resistor 37 connects to input terminal 20. The emitter of transistor 34 and anode of diode 35 connect to line 81 and the base of transistor 34 connects to the output of demodulator 40 through resistor 41. A capacitor 38 is connected between the base of transistor 34 and the emitter of transistor 32 in order to shunt any high frequency components that may appear at transistor 34.

The demodulator 40 includes an N-channel field effect transistor 42 connected in series with P-channel field effect transistor 43 at junction 44. The source of transistor 42 connects to line 81 and the source of transistor 43 connects to resistor 41 at demodulator output terminal 45. Resistors are respectively connected from gate to source of transistors 42 and 43 and the transistors are alternately made conducting and nonconducting by a capacitively coupled output signal on line 83 which is connected to the output of multivibrator 70. A positive signal on line 83 cuts off transistor 43 and turns on transistor 42 thereby effectively referencing the output of amplifier 50 to power line 81. The alternate negative signal on line 83 cuts off 42 and turns on 43 thereby coupling the output of amplifier 50 to the output terminal 45 of demodulator 40.

Amplifier 50 is a direct current integrated circuit differential amplifier having its output capacitively coupled to resistor 53 and thence to junction 44. Input power is obtained from line 81 and power return is to line 82. Amplifier signal input terminals 51 and 52 are capacitively coupled to modulator output terminals 61 and 62 respectively. The series combination of resistor 54, capacitor 55 and resistor 56 is connected between input terminals 51 and 52. The output of amplifier 50 is D.C. connected to the junction between resistor 54 and capacitor 55 by means of degenerative feedback resistor 57. This degenerative feedback of direct current signals insures that unwanted error signals such as thermoelectric potentials at the input terminals will have little effect on the amplifier control signal. An alternating voltage signal from modulator 60 will be amplified independently by amplifier 50 because of the capacitive coupling of both input and output terminals. The amplifier 50 is operated from a balanced voltage supplied by lines 81 and 82 which is maintained substantially constant by series connected Zener diodes 84 and 85. These diodes are of the same type and same voltage breakdown. The junction between the cathode of 85 and the anode of 84 is connected to the junction between capacitor 55 and resistor 56 at the input to amplifier 50 by line 88 thereby maintaining the input of amplifier 50 midway between the voltage on lines 81 and 82.

Modulator 60 includes field effect transistor 63 which is alternately made conducting and nonconducting by the multivibrator output capacitively coupled to the gate of transistor 63 from line 86. The output connections of transistor 63 connect directly to modulator output terminals 62 and 61 respectively. These output terminals are resistance coupled to network output terminals 11 and 13 respectively so that a D.C. output signal arising at terminals 11 and 13 from a network unbalance is alternately shorted and applied across amplifier terminals 51 and 52 at the frequency established by multivibrator 70.

Multivibrator 70 receives power from line 81 and has a power return to line 82. The multivibrator includes a pair of transistors oscillating in a continuous manner and, as shown, is of conventional design which requires no elaboration.

The basic operation of the circuit of FIG. 2 is similar to the description given in reference to FIG. 1. Amplifier 50 and current controller 30 function to maintain zero voltage between network terminals 11 and 13 and the total current drawn by the circuit is related to the network resistors $R_1$ through $R_6$ and reference voltage $V_c$ by expression (1). Amplifier 50 and multivibrator 70 are each powered between lines 81 and 82 which are maintained at substantially constant voltage by Zener diodes 84 and 85. Consequently the current component drawn by these elements is active in the network balance since the current return is from line 82 through linearizing resistor $R_6$ and current feedback resistor $R_5$ to output terminal 19. This current component is typically small and relatively constant and the main signal current is developed by virtue of network unbalance resulting in a change in current through Zener diodes 84 and 85 and thence over line 82 through resistors $R_6$ and $R_5$ to output terminal 19. Resistor 87 couples power from line 81 to the cathode of reference source $V_c$ which in turn supplies the network in the manner described with reference to FIG. 1. Resistor 87 substantially blocks the balancing current supplied from controller 30 from passing through reference element $V_c$ thereby minimizing any change in $V_c$ which might otherwise be caused by relatively large changes in current through $V_c$.

As an example of operability it was desired to deliver an output current varying from 10 to 50 milliamps for a temperature change from 0° C. to 100° C. as measured by a platinum resistance thermometer. A sensor resistance of nominally 100 ohms at 0° C. was selected and was simulated by a manually variable resistor substituted for $R_4$. Other network resistor values were 1.008 ohms for $R_5$, 2.26 ohms for $R_6$, 90.78 ohms for $R_3$ and 6187.2 ohms for each of $R_1$ amd $R_2$. Reference source $V_c$ was a IN-827 Zener diode having a nominal voltage of 6.2 volts and Zener diodes 84 and 85 were type IN-4739 controlling at about 8.4 volts. Resistor 87 was 1850 ohms and the input voltage from the D.C. source 24 was approximately 60 volts. Amplifier 50 was a type 709C direct current operational amplifier manufactured by Fairchild Semiconductor, Mountain View, California and the other components were of size and type to maintain the various circuit elements within their design ranges of operation.

When resistance $R_4$ was varied to correspond to the well known resistance change of platinum with temperature the results of Table 1 were obtained.

TABLE 1

| Simulated Temperature | Resistance $R_4$ | Current $I_f$ |
|---|---|---|
| 0 deg C. | 100.00 ohms | 10.000 ma |
| 25 deg C. | 109.92 ohms | 19.999 ma |
| 50 deg C. | 119.77 ohms | 30.000 ma |
| 75 deg C. | 129.55 ohms | 40.004 ma |
| 100 deg C. | 139.25 ohms | 50.001 ma |

The results in Table 1 are one example of the close agreement which is obtained between a measurand and output current for the circuits herein disclosed. Although the example was for a current range of 10–50 ma for a 100 ohm temperature sensor and a 100° C. range it is apparent that the circuits are suitable for operation over a wide range of variables and the current range achieved may also be selected over a wide range while using the circuits which are described and illustrated herein.

An alternate schematic of the general network 10 shown in FIG. 1 is shown in FIG. 3. The network of FIG. 3 is substantially equivalent to network 10 and the operation follows the same formula relating total current, reference source $V_c$ and the resistors making up the network. The network of FIG. 3 was derived from 10 by transformation of the "wye" circuit comprising $R_3$, $R_5$, and $R_6$ of FIG. 1 to the "delta" circuit comprising resistors, $R_7$, $R_8$, and $R_9$ of FIG. 3. Expression (1) may also be applied to the network arrangement of FIG. 3 where the following transformations apply:

$$R_7=(R_5R_6+R_5R_3+R_3R_6)/R_6 \quad (4)$$

$$R_8=(R_5R_6+R_5R_3+R_3R_6)/R_5 \quad (5)$$

$$R_9=(R_5R_6+R_5R_3+R_3R_6)/R_3 \quad (6)$$

The network arrangement of FIG. 3 may be substituted directly into the circuit of FIG. 1 or the circuit of FIG. 2 by connecting terminals 11, 13, 14 and 19 to the terminals of like numbers in FIG. 1 or FIG. 2 and disconnecting the corresponding networks shown in those Figures. The current derived from differential input current controller 16 may be applied directly to terminal 14 as shown in FIG. 1 but in the preferred embodiment the major portion of the controlled current is delivered to the network at terminal 26 as was shown in the circuit description of FIG. 2.

I claim:

1. A measuring system comprising a pair of *current* terminals, a source of direct current and a load, means to connect the source and load in series between said current terminals, means to provide a variable voltage signal which varies in magnitude as a function of a variable condition to be measured *said variable voltage means including voltage reference source means for generating a reference voltage*, a current adjusting controller means having a voltage responsive input coupled to said variable voltage means for receiving said variable voltage signal and adjusting the current through said terminals as a function of the magnitude of the variable voltage signal at said input, said controller means being connected across said terminals and energized solely from current supplied through said terminals, resistance means connected to said current terminals *and said voltage reference source means* to provide a voltage feedback which is a function of *said reference voltage and* total current flowing through said terminals, and means connecting said resistance means to said input of said controller means to provide the feedback voltage as determined by the current through said resistance means to tend to balance a change in the variable voltage signal at said input occurring due to a change in magnitude of said variable condition and to stabilize the adjusted current through said terminals at a new magnitude which is representative of a change in magnitude of said variable condition.

2. The measuring system of claim 1 wherein there is provided resistance network means for providing a variable voltage signal, said network means being connected to said terminals, energized solely through said terminals, and including a first resistor which varies in value as a function of the variable condition to be measured, and comprising at least portions of the first mentioned means to provide a variable voltage signal, the first mentioned resistance means and the means connecting the resistance means to said input.

3. The measuring system of claim 2 wherein said resistance network means includes additional resistance means, said means to connect said first mentioned resistance means to said input including means to connect said first resistor, said first mentioned resistance means and said additional resistance means in a bridge circuit and to provide bridge voltage output terminals that are connected to said voltage responsive [imput] *input*.

4. The combination of claim 2 wherein the first mentioned resistance means comprises a second resistor and the resistance network means additionally comprises third, fourth, and fifth resistors, all of said resistors being connected in a closed series loop having the first resistor connected between the second and fourth resistors and the third resistor connected between the second and fifth resistors.

5. The combination of claim 4 [and a] *wherein said* voltage reference *source* means [to provide] *provides* a reference voltage for said *resistance* network means *and is* connected between a junction intermediate said fourth and fifth resistors and a junction intermediate said second and third resistors.

6. The combination of claim 2 wherein the first mentioned resistance means comprises a second resistor and said resistance network means additionally comprises third, fourth, and fifth resistors, all of said [resistor] *resistors* being connected in a closed series loop, said first resistor being connected between the second resistor and fourth resistor and the third resistor connected between the second and fifth resistors, and wherein the voltage reference *source* means is connected for current conduction from the junction of the [third and second] *fourth and fifth* resistors to the junction of the [fourth and fifth] *second and third* resistors, the junction of the first and fourth resistors comprising a first voltage terminal and the junction of the fifth and third resistors comprising a second voltage terminal, and the junction of the first and second resistors being coupled to one of said first mentioned pair of terminals and the other of said first mentioned pair of terminals being connected to the junction of said [second and third] *fourth and fifth* resistors.

7. The combination of claim 6 [and a] *wherein said* voltage reference *source* means *is* connected to said resistance network means and to said first mentioned pair of current terminals to provide a reference voltage for said resistance network means, [including] *and comprises* a voltage reference element connected to the junction of said fourth and fifth resistors and a sixth resistor connected between the voltage reference element and the junction of the third and the second resistors and wherein the sixth resistor is connected in series with the second resistor and the first mentioned pair of current terminals.

8. The combination of claim 7 wherein the voltage reference element is a Zener diode.

9. The combination of claim 2 wherein said resistance network means includes second, third and fourth resistors connected in a symmetrical bridge arrangement having one end of said first resistor connected to one end of said third resistor and one end of said second resistor being connected to one end of said fourth resistor, the other ends of said first and second resistors being connected to one of said terminals, a fifth resistor having one end connected to [the other end] *said one* of said terminals, and a sixth resistor having one end connected to the junction of said second and fourth resistors, and *said* voltage reference *source* means for providing a reference voltage for said resistance network means [including] *includes* a voltage reference element having one end connected to the junction of said third and fourth resistors and the other end connected to the other end of said fifth resistor, and the other end of said voltage reference element being connected to the other end of said sixth resistor.

10. A transmitter for measuring a variable voltage dependent upon the value of a variable parameter, first and second wires each having a first end portion and a second end portion, a transmitter connected across said second end portions, a measuring device, current source means for providing the sole energy supply to the transmitter and the current that serves to transmit a signal from the transmitter, said measuring device and current source means being connected in series across the first end portions of said wires, said transmitter including means *for* providing a voltage that varies in response to the variation of the parameter to be measured, *and including internal means for generating a reference voltage* amplifier means having an input portion coupled to said variable voltage providing means and an output portion for providing an output voltage at said output portion that is dependent on the magnitude of the variable voltage at said input portion, means coupled to the output portion and the second end portions of said wires for regulating the flow of current through the wires as a function of the output voltage including feedback resistor means coupled *to said internal means for generating a reference voltage and* across the second end portions of the wires for generating a feedack voltage dependent upon *said reference voltage and* the current flowing in said wires, and means for electrically connecting said feedback resistor means to the input portion of said amplifier means to tend to balance variations in magnitude of the variable voltage at said input portion.

11. The combination as specified in claim 10 wherein said means providing a voltage that varies in response to variation of the parameter to be measured comprises a resistance network including a first resistor which varies in resistance as a function of [a] *the* parameter to be measured, said feedback resistor means comprising a second resistor in said resistance network, said resistance network further including third and fourth resistors, said first, second, third, and fourth resistors being connected in a symmetrical bridge arrangement having one end of said first resistor connected to one end of said third resistor to provide a first voltage terminal, and one end of said second resistor being connected to one end of said fourth resistor to provide a second voltage terminal, and wherein the other ends of said first and second resistors are connected to one of said wires and the other ends of said third and fourth resistors are connected together to the other of said wires, said feedback resistor means further including fifth and sixth resistors and [a] *said* voltage reference means for providing a reference voltage for said resistance network including a voltage reference element having cne end connected to the junction of said third and fourth resistors and the other end connected through said fifth resistor to [the other] *said one* of said wires and through said sixth resistor to said second voltage terminal.

12. An electrical current transmitting system comprising a pair of current terminals adapted for connection to a load and power source that are *connected* in series; a resistance network means *including means for generating a reference voltage connected therein, said resistance network means* connected in series with said current terminals to be powered and excited solely therethrough for providing a first variable voltage signal which varies as a function of the magnitude of a physical condition to be measured; a feedback resistance means connected to said resistance network means for providing a second voltage signal which is a function of *said reference voltage and* the current through said feedback resistance means; means to be powered solely through said terminals *and* connected to the feedback resistance means and to the current terminals to establish a current flow path between said terminals and to provide a known portion of current flowing between said terminals through said feedback resistance means including an amplifier means having a voltage input portion and an output portion providing an output signal which is a function of the voltage at said voltage input portion, and current control and adjustment means coupled to said output portion to receive the output signal and to adjust the current in said current flow path between said terminals as a function of said output signal; and means to couple said resistance network means to said voltage input portion to provide a voltage at said input portion of said amplifier means which is a function of said first and second voltage signals.

13. The combination of claim 12 further characterized in that [a] *said* voltage reference means is connected to said resistance network means in series with said feedback resistance means between said terminals to provide a reference voltage for said resistance network means.

14. The combination of claim 13 wherein said network means includes a first resistor, and said voltage reference means includes a fixed resistance and a semiconductor reference element in series with said fixed resistance, the series combination of said reference element and fixed resistance being connected across said first resistor so that an increase in excitation voltage across said first resistor is provided as a result of an increased current through said voltage reference means.

15. The combination of claim 12 wherein said amplifier means comprises a chopper driver having a driver output terminal; said means to couple comprising a modulator means having first and second input terminals connected to said resistance network means to sense voltages in said network means, a third input terminal capacitively connected to the [drive] *driver* output terminal and a modulator output terminal; an operational amplifier having an input terminal connected to the modulator output terminal and having an output terminal; a demodulator having a first input terminal connected to the amplifier output terminal, a second input terminal capacitively connected to the driver output terminal and having an output terminal; and said current control and adjustment means comprising a current control stage having a first input terminal connected to the demodulator output terminal, a second current terminal connected to one of the transmitting system pair of current terminals and a third terminal means connected to pass current through portions of said resistance network including said feedback resistance means to the other of the transmitting system pair of current terminals.

16. A signal transmitter comprising a pair of wires, a load, current supply means for providing a load current through said load and wires connected in series with the load across first ends of said wires, a current transmitter connected across said wires at the other [end] *ends* thereof, the current flowing through said wires serving as the sole power supply to the transmitter as well as serving at the load to represent the signal transmitted from said transmitter, said transmitter including an input circuit means connected to said two wires to provide a variable voltage which tends to change in response to changes in a variable condition constituting the information to be transmitted and voltage responsive current controller means connected to the two wires and the input circuit means for adjusting the current through said two wires in response to the voltage supplied by the input circuit means, *said input circuit means including a voltage reference element connected therein,* feedback resistor means connected to said current controller means and in series with said wires to have at least a known portion of load current carried by said wires flowing therethrough to provide a feedback voltage dependent on *the reference voltage produced by said voltage reference element and* the magnitude of said load current, and means connecting said feedback resistor means to the input circuit means to provide a feedback voltage in opposition to the variable voltage so that the input voltage to the current controller means is dependent upon the variable voltage and the feedback voltage whereby adjusted load current flowing through said wires and load is representative of the magnitude of said variable condition.

17. The transmitter of claim 16 wherein the current controller means comprises a chopper driver having a driver output, a modulator having input terminals connected to the input circuit means, means coupling the driver output to said modulator, an amplifier having an input and an output and having its input connected to the modulator output, a demodulator having an input connected to the amplifier output, means coupling the driver output to the demodulator, and a current control stage having a first input terminal connected to the demodulator output, a second input terminal connected to one of said wires and an output terminal connected to the other of said wires.

18. The signal transmitting system of claim 16 wherein said input circuit means comprises [a] *said* resistance network means to provide a variable voltage including a first resistor which changes in value in response to a change in a variable condition and said feedback resistor means comprises a second resistor also coupled to said resistor network means, said resistance network means further including third, fourth and fifth resistors, all of said resistors being connected in a closed series loop having the first resistor connected between the second and fourth resistors and the third resistor connected between the second and fifth resistors, and a voltage reference element and a sixth resistor connected in series between the junction of said fourth and fifth resistors and the junction of said second and third resistors, said means to couple said input circuit to said two wires comprising means coupling one of said wires to the junction of the fourth and fifth resistors to carry a first portion of the current to said resistance network and means also coupling the junction of the voltage reference element and the sixth resistor to said one wire to carry a second portion of the current in the one wire to the resistance network, said last-mentioned junction being connected through portions of said resistance network to the other wire and hence to said current supply means.

19. [An] *In combination an* electrical network comprising six resistors and a source of constant voltage connected together and including first and second signal output terminals, a current input terminal and a current output terminal and means providing a source of current to said current input terminal, wherein the six resistors designated $R_1$ through $R_6$ and the *constant* voltage source designated $V_c$ are connected to be equivalent to an arrangement having $R_1$, $R_2$, $R_3$, [$R_4$, $R_5$] $R_5$, $R_4$ connected in a closed series loop in the order cited having the first and second signal output terminals between $R_1$ and $R_4$ and between $R_2$ and $R_3$ respectively, the current input terminal between $R_1$ and $R_2$, and the current output terminal between $R_4$ and $R_5$, and the source $V_c$ serially connected with $R_6$ from a junction between $R_1$ and $R_2$ to a junction between $R_3$ and $R_5$, and connecting means to deliver a variable current from said current source means to a junction between $V_c$ and $R_6$ so that the total current designated $I_T$ delivered to the network which results in zero voltage difference at the first and second signal output terminals is $$I_T = V_c[R_2(R_4+R_5)-R_1R_3]/[R_1[R_5(R_2+R_3)+R_6(R_3+R_5)]-R_2R_4R_6]$$

and wherein the resistor designated $R_4$ varies with respect to a varying measurand approximately as $$R_4 = R_0(1+\alpha T-\beta T^2)$$

where T is the measurand, $R_0$ is the value of $R_4$ at a zero reference value of the measurand, $\alpha$ and $\beta$ are constants and the resistor $R_6$ is selected to satisfy the equation $$R_6 = \frac{R_2 + R_3}{\frac{R_2}{R_1}\left[\frac{R_0}{R_5}\left(\frac{\alpha^2}{\beta} - 2\right) - 1\right] - 1}$$

so that the total current $I_T$ is linearly proportional to the measurand.

20. An electrical current transmitting system comprising first means providing a first voltage input signal, second means providing second voltage input signal, a first electrical circuit that includes said first and second means, said first circuit also including feedback resistance means to provide a voltage feedback signal proportional to the total current flow in said first circuit, an amplifier connected to the first circuit and energized by the first circuit for providing an output responsive to voltage unbalance between the first and second input signals and said feedback signal, means connected to the amplifier are responsive to the output of said amplifier for adjusting the current flowing through the first circuit to increase the current through said first circuit, and at the same time increase the current through said feedback resistance means when said first voltage input signal increases with respect to said second voltage input signal and to decrease the current through said first circuit and at the same time decrease the current through said feedback resistance means when said first voltage input signal decreases with respect to said second voltage input signal and to thereby correspondingly increase or decrease the magnitude of the feedback signal as determined by the amount of the current is adjusted, and a voltage reference element means connected to said first circuit for passing a portion of the current flowing through the first circuit to maintain said second voltage which is provided by said second means at a reference value, means to connect said feedback resistance means in said first circuit to provide a change in the magnitude of the feedback signal determined by the amount of current is adjusted to modify the voltage magnitude of the first input signal to tend to reduce any voltage difference between the first and second input signals, said first circuit carrying the total current for the electrical transmitting system, which is representative of the magnitude of said variable condition.

21. The combination of claim 19 and resistance means connected in series with said voltage reference element means and said means for adjusting the current to provide a small positive adjustment signal to the second voltage when the current increases.

22. A measuring system comprising a direct current source, a load, a single pair of wires, said source, load and wires being connected in series so that load current which flows through said load also flows through said pair of wires, current adjustment means for controlling and adjusting the flow of current through said wires and said load, means to connect said current adjustment means in series with said wires, means *including means for generating a fixed voltage* for providing first and second voltages which differ from each other in accordance with the magnitude of a variable condition, *and depend upon said fixed voltage* voltage responsive means having an input connected to the last mentioned means to sense differences in said first and second [voltages] *voltage*, said voltages responsive means also being connected to said current adjustment means for providing a control signal controlling said current adjustment means to change the current through said wires and said load in accordance with the difference between said first and second voltages, said means to connect including resistance means to provide a feedback voltage that varies as a known function of the value of total current through said load, and means connecting said resistance means to said means for providing the first and second voltages to provide variations in said feedback voltage caused by changes in current through said wires and said load to the input of the voltage responsive means to tend to maintain the difference between said first and second voltages substantially constant so that the changed current flowing through said wires and load as adjusted by said current adjustment means is representative of the magnitude of said variable condition.

23. A current transmitting system having all electrical actuation comprising a circuit having an input terminal and an output terminal, a first DC voltage signal input means for receiving a first DC voltage signal, a second DC voltage signal input means for receiving a second DC voltage signal, amplifier and control means connected in said circuit to be powered solely through said input and output terminals and coupled to both of said input means for controlling the total current flow in said circuit in response to DC voltage signals provided by said first and second voltage signal input means, a DC resistance bridge means coupled to the output of the amplifier and control means and being coupled to said first and second signal input means for providing DC voltage signals to said first and second signal input means, *voltage reference means for generating a fixed DC voltage and connected in said DC resistance bridge,* means connected to said bridge to change the voltage at one of the signal input means, a fixed feedback resistor means coupled in said bridge and to said amplifier and control means to be responsive to total current flow between said input and output terminals to provide a voltage signal in the bridge means due to the current flow through said feedback resistor means to reduce any difference between the DC signals at the voltage signal input means as the current between said input and output terminals changes, whereby the changed current flow between said input and output terminals represents the amount of change in the value of the voltage signal provided by said first signal input means with respect to the voltage signal provided by said second signal input means.

*24. An arrangement for measuring a physical parameter comprising:*

*first and second terminals;*

*current measuring means and a power supply connected in series between said first and second terminals;*

*a current regulator connected to said first terminal for regulating current flow through the series combination of said measuring means and said power supply in response to a voltage signal;*

*a resistance network comprising feedback means for generating a feedback signal and connected to said second terminal and to said regulator for generating said voltage signal as a function of said parameter and said feedback signal, said voltage signal being dependent upon the total current flow through said series combination; and*

*a voltage reference source connected to said network to establish a reference voltage across said network, wherein said total current flows through said network and said regulator and serves as the sole source of energy for said network and said regulator.*

*25. The measuring arrangement in accordance with claim 24 wherein:*

*said network further comprises:*

*a first resistor having a resistance value which varies as a function of said parameter, and second, third, and fourth resistors; all of said resistors being connected into a bridge circuit with said first resistor connected to first ends of said second and third resistors and said fourth resistor connected to the other ends of said second and third resistors with the junction of said first and second resistors being connected to said second terminal;*

*said feedback means comprising fifth and sixth resistors connected in series between said second terminal and the junction of said second and fourth resistors; and*

*said voltage reference source connected for current conduction from the junction of said third and fourth resistors to the junction of said fifth and sixth resistors, the junction of said third and fourth resistors connected to said regulator.*

*26. The measuring arrangement in accordance with claim 24 wherein:*

*said resistance network comprises first, second, third, and fourth resistors, and said feedback means comprises a fifth resistor, all of said resistors connected into a closed series loop, said first resistor being connected between said second and fourth resistors and said third resistor connected between said second and fifth resistors and said fourth and fifth resistors connected together to close the loop;*

*said voltage reference source being connected for current conduction from the junction of said fourth and fifth resistors to the junction of said second and third resistors;*

*the junction of said first and fourth resistors defining a first voltage terminal and the junction of said third and fifth resistors defining a second voltage terminal, said voltage terminals being connected to said regulator to provide said voltage signal; and*

*the junction of said first and second resistors being connected to said second terminal and the junction of said fourth and fifth resistors being connected to receive current from said regulator.*

*27. The measuring arrangement in accordance with claim 26 wherein said first resistor varies in resistance value as a function of said parameter.*

*28. The measuring arrangement in accordance with claim 26 further comprising a sixth resistor connected in series with said voltage reference source whereby said reference voltage is a function of said total current.*

* * * * *

UNITED STATES PATENT AND TRADEMARK OFFICE

CERTIFICATE OF CORRECTION

PATENT NO. : RE 30,603

DATED : May 5, 1981

INVENTOR(S) : EARL A. GRINDHEIM

It is certified that error appears in the above-identified patent and that said Letters Patent are hereby corrected as shown below:

Column 1, line 31, "of" should be --or--.

Column 2, line 52, "FIg" should be --FIG--.

Column 12, line 33, "[a] said" should be --a--; and line 43, "a" should be --said--.

Column 13, line 40, "are" should be --and--.

Column 14, lines 16-17, "[voltages] voltage" should be --voltages--; and line 17, "voltages" should be --voltage--.

Signed and Sealed this

Eighth Day of September 1981

[SEAL]

*Attest:*

GERALD J. MOSSINGHOFF

*Attesting Officer*

*Commissioner of Patents and Trademarks*